(12) United States Patent  
Srinivasan et al.

(10) Patent No.: US 9,124,639 B2  
(45) Date of Patent: *Sep. 1, 2015

(54) MANAGING COMMAND COMPLIANCE IN INTERNETWORKING DEVICES

(71) Applicant: Cisco Technology, Inc., San Jose, CA (US)

(72) Inventors: Shyam Sundar Srinivasan, Chennai (IN); Rajagopal Jayaraman, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/489,282

(22) Filed: Sep. 17, 2014

(65) Prior Publication Data

US 2015/0007260 A1    Jan. 1, 2015

Related U.S. Application Data

(63) Continuation of application No. 12/634,738, filed on Dec. 10, 2009, now Pat. No. 8,856,292.

(51) Int. Cl.
*G06F 15/173* (2006.01)
*H04L 29/06* (2006.01)
*H04L 12/24* (2006.01)

(52) U.S. Cl.
CPC ............ *H04L 63/20* (2013.01); *H04L 41/0866* (2013.01); *H04L 63/0892* (2013.01); *H04L 41/0856* (2013.01); *H04L 63/0281* (2013.01)

(58) Field of Classification Search
CPC .................................................. G06F 9/44505

USPC .......................................................... 709/221  
See application file for complete search history.

(56) References Cited

U.S. PATENT DOCUMENTS

| 7,080,371 | B1 * | 7/2006 | Arnaiz et al. .................. 717/170 |
| 8,260,900 | B2 * | 9/2012 | Morrison et al. ............. 709/223 |
| 2007/0230453 | A1 * | 10/2007 | Giaretta et al. ............... 370/389 |
| 2009/0061907 | A1 * | 3/2009 | Richardson et al. .......... 455/458 |
| 2010/0070655 | A1 * | 3/2010 | Chamley et al. ................... 710/5 |
| 2010/0228854 | A1 * | 9/2010 | Morrison et al. ............. 709/224 |
| 2011/0030029 | A1 | 2/2011 | Woo |

OTHER PUBLICATIONS

U.S. Appl. No. 12/634,738, filed Dec. 10, 2009, Final Office Action, Feb. 12, 2014.
U.S. Appl. No. 12/634,738, filed Dec. 10, 2009, Notice of Allowance, Jun. 4, 2014.

(Continued)

*Primary Examiner* — Hamza Algibhah
(74) *Attorney, Agent, or Firm* — Hickman Palermo Becker Bingham LLP (57) ABSTRACT

In an embodiment, an internetworking device is configured with compliance proxy logic that is configured for sending, to a compliance server, a request to determine whether the command conforms to one or more compliance policies, wherein the request includes the command; receiving a compliance response from the compliance server; in response to determining whether the compliance response indicates success, executing the command only when the compliance response indicates that the command conforms to the one or more compliance policies. Thus the device can determine actively whether a proposed user command or configuration change will violate established standards or policies, before the command or change is applied to the device.

20 Claims, 4 Drawing Sheets

(56) References Cited

OTHER PUBLICATIONS

U.S. Appl. No. 12/634,738, filed Dec. 10, 2009, Office Action, Oct. 3, 2012.

U.S. Appl. No. 12/634,738, filed Dec. 10, 2009, Office Action, Jul. 30, 2013.

U.S. Appl. No. 12/634,738, filed Dec. 10, 2009, Final Office Action, Apr. 23, 2013.

* cited by examiner

Fig. 5

MANAGING COMMAND COMPLIANCE IN INTERNETWORKING DEVICES

CROSS REFERENCE TO RELATED APPLICATIONS; PRIORITY CLAIM

This application claims the benefit under 35 USC §120 as a Continuation of application Ser. No. 12/634,738, filed Dec. 10, 2009, which claims the benefit under 35 U.S.C. §119 of India Application No. 2222/DEL/2009, filed Oct. 27, 2009, entitled "Active Compliance Measurement," the entire contents for each of which are hereby incorporated by reference as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present disclosure generally relates to network management.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Compliance management refers to processes implemented in information technology (IT) organizations to determine whether computing devices of an enterprise conform to policies defined by the enterprise. Varying approaches have been used in an attempt to apply compliance management to internetworking devices such as routers, switches and other network infrastructure. In some approaches, network configuration and change management (NCCM) application programs are configured to listen for a notification of a configuration change, or to poll a device periodically to determine whether a configuration change has occurred. If a change is detected, then the NCCM application fetches a copy of the current running configuration from the device, stores an archival copy, applies enterprise policies, and determines whether the running configuration complies with the policies or other standards.

If violations are found, then an administrator can be alerted. However, this approach is reactive in nature and cannot prevent users or systems from applying non-compliant configurations to the devices. By the time a policy violation is found, damage may have been done.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Examples of Internetworking Devices
3.0 Processing Example
4.0 Implementation Mechanisms—Hardware Overview
5.0 Extensions and Alternatives 1.0 General Overview In an embodiment, an internetworking device is configured with compliance proxy logic that is configured for sending, to a compliance server, a request to determine whether the command conforms to one or more compliance policies, wherein the request includes the command; receiving a compliance response from the compliance server; in response to determining whether the compliance response indicates success, executing the command only when the compliance response indicates that the command conforms to the one or more compliance policies. Thus the device can determine actively whether a proposed user command or configuration change will violate established standards or policies, before the command or change is applied to the device.

In an embodiment, a data processing apparatus comprises a plurality of network interfaces that are coupled to a data network for receiving one or more packets therefrom and sending one or more packets thereto; one or more processors; a switching system coupled to the one or more processors and packet forwarding logic, wherein the switching system and packet forwarding logic are configured to receive packets on a first network interface, determine a second network interface on which to send the packets, and to send the packets on the second network interface; a computer-readable storage medium storing one or more stored sequences of instructions which, when executed by the one or more processors, cause the one or more processors to perform receiving a command to configure the apparatus or perform an operation on the apparatus and intercepting the command before execution; sending, to a compliance server, a request to determine whether the command conforms to one or more compliance policies, wherein the request includes the command; receiving a compliance response from the compliance server; in response to determining whether the compliance response indicates success, executing the command only when the compliance response indicates that the command conforms to the one or more compliance policies.

In an embodiment, the compliance server is a computer that is separate from the apparatus. In an embodiment, the apparatus further comprises instructions which when executed cause forming the request according to an authentication, authorization and access (AAA) protocol and sending the request to a AAA server; wherein the receiving comprises receiving the compliance response from the AAA server. In an embodiment, the compliance server is hosted within the AAA server.

In an embodiment, the compliance server is configured to execute, in response to receiving the request, any one or more of: posture validation operations on the apparatus, diagnostic commands on the apparatus, or one or more other compliance checks on the apparatus. In an embodiment, the compliance server is configured to download a copy of a then-currently running configuration from the apparatus before performing the posture validation operations, diagnostic commands, or other compliance checks, and to use the copy of the running configuration to determine whether the command would conform to the compliance policies when applied to the running configuration.

In an embodiment, the apparatus further comprises instructions which when executed cause blocking execution of the command when the compliance response indicates that the command conforms to the one or more compliance policies, and performing a responsive action. An embodiment further comprises instructions which when executed cause any one or more of: generating a user notification of non-compliance in a command line interface of the apparatus; creating and storing a log record relating to the non-compliance; or generating one or more events or alerts relating to the non-compliance.

In an embodiment, the computer-readable storage medium comprises compliance proxy logic integrated into an operating system.

In an embodiment, a computer-readable storage medium stores one or more stored sequences of instructions which, when executed by the one or more processors, cause the one or more processors to perform receiving a command to configure an internetworking device or perform an operation on the device and intercepting the command before execution; sending, to a compliance server, a request to determine whether the command conforms to one or more compliance policies, wherein the request includes the command; receiving a compliance response from the compliance server; in response to determining whether the compliance response indicates success, executing the command only when the compliance response indicates that the command conforms to the one or more compliance policies.

In other embodiments, the invention encompasses other computer apparatus configured to carry out the functions described herein.

2.0 Examples of Internetworking Devices

Figure 1:
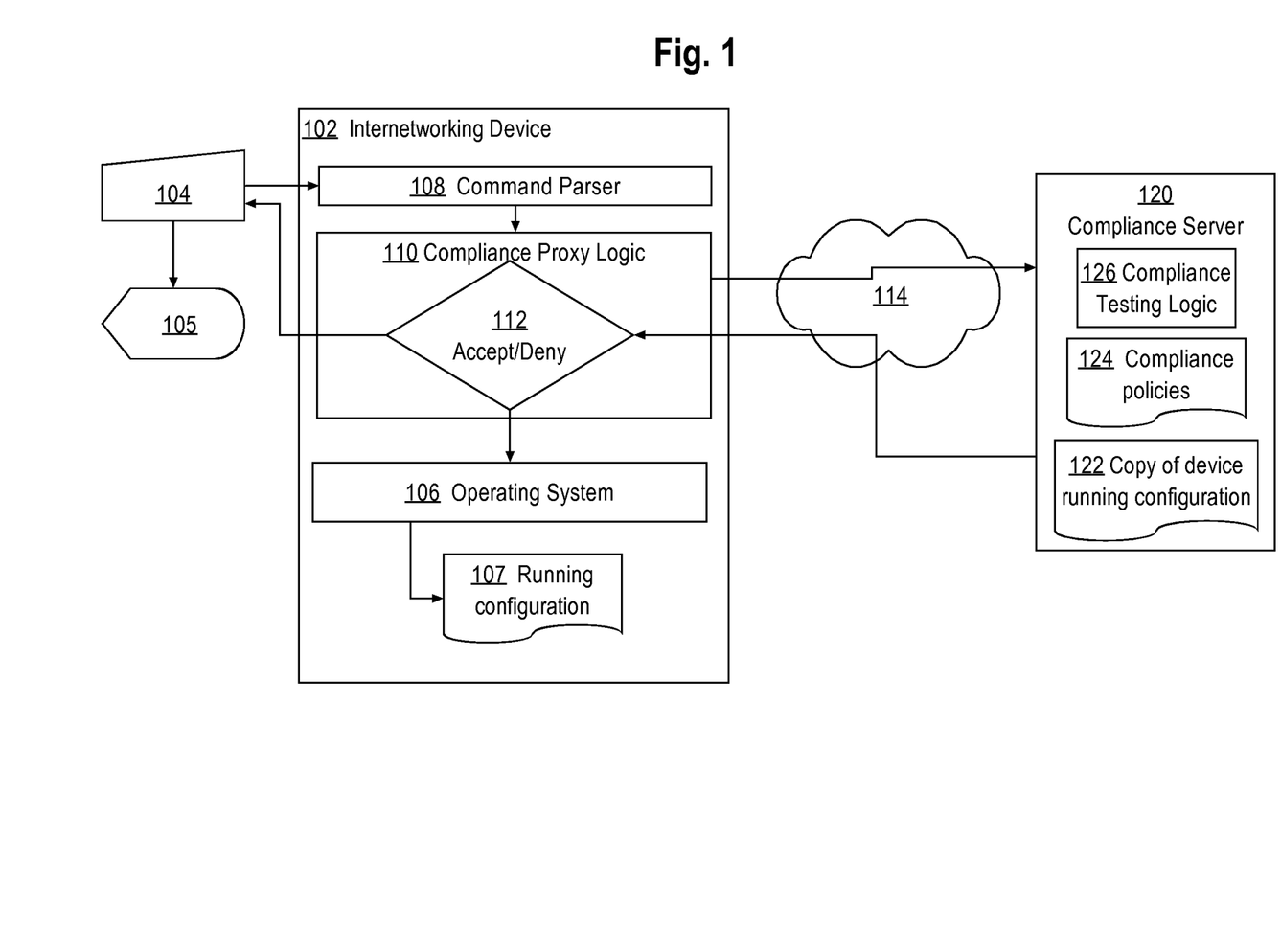
FIG. 1 illustrates an internetworking device configured with compliance proxy logic coupled to a compliance server.
Figure 2:
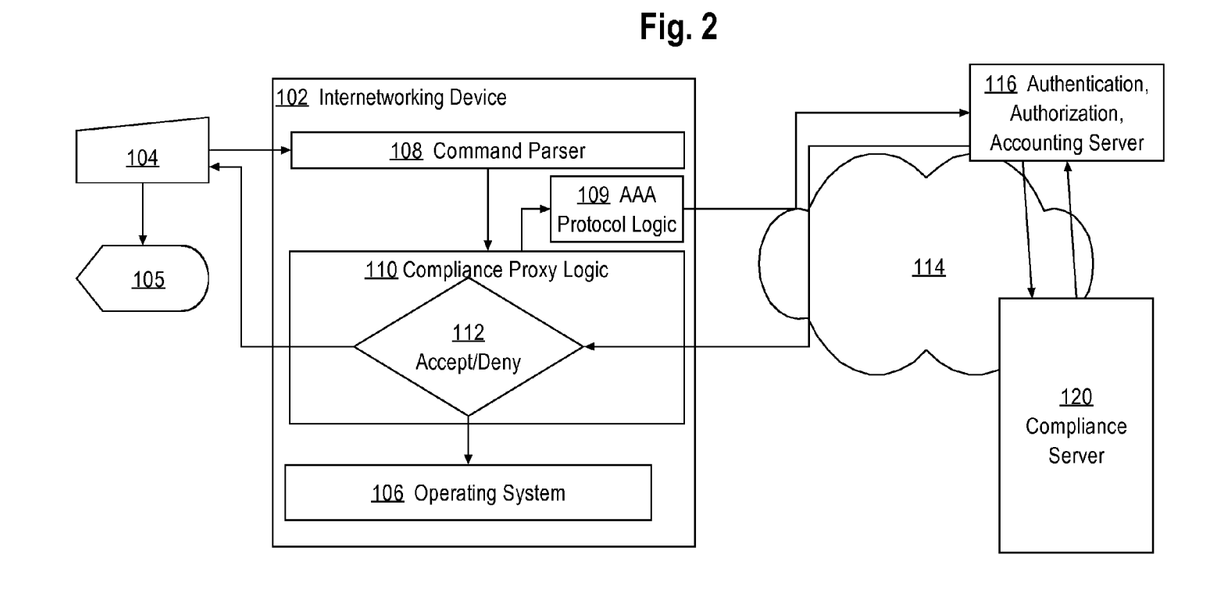
FIG. 2 illustrates another embodiment of an internetworking device configured with compliance proxy logic coupled to an authentication, authorization and accounting (AAA) server and to a compliance server.
Figure 3:
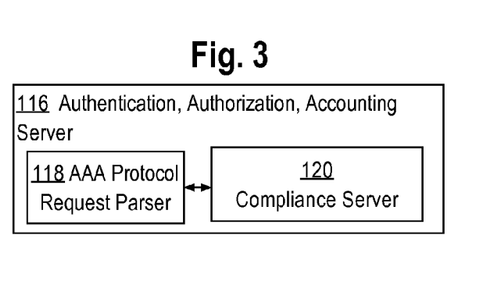
FIG. 3 illustrates an embodiment of a compliance server.

FIG. 1 illustrates an internetworking device configured with compliance proxy logic coupled to a compliance server; FIG. 2 illustrates another embodiment of an internetworking device configured with compliance proxy logic coupled to a AAA server and to a compliance server; FIG. 3 illustrates an embodiment of a compliance server. Referring first to FIG. 2, in an embodiment, an internetworking device 102 comprises an operating system 106, command parser 108, and compliance proxy logic 110. Device 102 may comprise, in various embodiments, a packet data router, switch, gateway, or other networking infrastructure element having the internal structure described in more detail in connection with FIG. 5.

In some embodiments, device 102 is coupled to a user terminal 104 having one or more data input devices such as a keyboard and pointing device, and having an output device such as display 105. User terminal 104 may be coupled to a console port of the device 102 or may communicate through one or more networks. User terminal 104 is configured to provide user input such as configuration commands or device operation requests to command parser 108 and to receive responses from compliance proxy logic 110.

In other embodiments, one or more computer programs, other software elements, or other computers are coupled using programmatic mechanisms or logic to the command parser 108. For example, operating system 106 may include or host various application programs that are configured to call an application programming interface (API) of the operating system or of the command parser to programmatically submit commands to the system. Thus, there is no requirement to receive commands from user terminal 104 or from a user, and fully automated approaches may be used.

Operating system 106 may include or may be coupled to a stored running configuration 107 representing all commands and operations that have been previously performed, as part of bootstrap loading or subsequent user configuration, to cause the device 102 to reach its then-current operational state. Running configuration 107 may comprise a list of commands and parameter values and may be implemented in one or more flat files, lists, databases, or in structured storage such as management information bases (MIBs) accessible using simple network management protocol (SNMP).

Compliance proxy logic 110 is coupled directly or indirectly through network 114 to a compliance server 120. In various embodiments, network 114 represents one or more local area networks, wide area networks, internetworks, or a combination thereof using wired or wireless, terrestrial or satellite links.

Compliance server 120 comprises a copy of the running configuration of the device 102, stored compliance policies 124, and compliance testing logic 126. As further described in relation to FIG. 4, compliance proxy logic 110 is configured to intercept configuration commands or device operational requests that are received at command parser 108 and to redirect the commands or requests to compliance server 120. The compliance testing logic 126 of compliance server 120 is configured to receive the intercepted configuration commands or operation requests and to determine whether performing the commands or requests on the device 102 will violate one or more of the compliance policies 124. To determine compliance, the compliance server may compare the proposed commands or operations to the stored compliance policies. Compliance determinations also may include reading the copy of the device running configuration 122 to determine if proposed commands or operations are incompatible with existing configuration commands, settings or parameters.

Compliance proxy logic 110 may be integrated into or implemented as part of a CLI module or CLI parser coupled to or within the operating system 106. The command parser 108 may represent the CLI module or CLI parser. In some embodiments, the functions of operating system 106, command parser 108 and compliance proxy logic 110 may be implemented as a single functional module or logical block.

In an embodiment, compliance server 120 may be implemented by modifying instances of CiscoWorks Network Compliance Manager (NCM), or Cisco Resource Management Essentials (RME), from Cisco Systems, Inc. to function according to the processes and architectures described herein. For example, the NB API of CiscoWorks NCM could be modified to implement compliance server 120. CiscoWorks NCM and Cisco RME have the drawbacks noted in the Background and do not presently offer the pro-active capabilities described herein.

Compliance policies 124 are configured on the compliance server 120 before the compliance server is deployed or activated to begin testing compliance of commands or operations with respect to device 102. The device 102 may be configured, as part of its running configuration 107, with a name or network location of the compliance server 120 and one or more backup compliance servers to contact in the event that one server does not respond to a compliance request. Configuring compliance policies 124 on the compliance server 120 may be accomplished using an interface or configuration logic hosted on the compliance server, or using an interface or configuration logic hosted on or in a separate network management station.

In general, each of the compliance policies comprises a rule specifying, for a particular associated command, one or more other required device commands or parameters that must be configured on the device prior to execution of the associated command. Compliance policies 124 may be configured, in one embodiment, as a set of rules and compliance testing logic 126 may be configured to match keywords in a proposed command or operational request to the rules, and also to perform actions that are identified in matching rules.

For example, the actions may include parsing or scanning the copy of the device running configuration 122 to check for the presence or absence of certain commands, the presence or absence of which is required as a condition for running or applying the proposed command or operational request. Compliance policies often relate to security settings of a device, but are not limited to addressing security. For example, a condition for running or applying a particular command, which causes a particular TCP port to be open or closed, may be that various security parameters were previously set. Alternatively, one of the compliance policies 124 may provide that before a command to open a particular port can execute, a user must give express confirmation or approval through the command-line interface.

Further, the actions identified in a rule may include executing a diagnostic command on the device 102, receiving output from the command, and then executing pattern matching rules or tests on the output to determine whether expected output is received. Thus, a policy rule is not limited to a set of matching criteria but may include actively initiated tests to determine whether the device is then currently configured in a required way prior to executing a new command.

Compliance server 120 is further configured to return a response from the compliance testing logic 126 to the compliance proxy logic 110. In response, the compliance proxy logic 110 applies accept-deny logic 112 to determine whether to execute the command or operation, or to generate a notification, error, alert, log entry, or perform other responsive action.

Referring now to FIG. 2, in another embodiment, internetworking device 102 further comprises AAA protocol logic 109, which is configured to form requests and parse responses that conform to a AAA protocol. Examples of AAA protocols include Remote Authentication Dial In User Service (RADIUS), which is defined in Request for Comments (RFC) 2865 of the Internet Engineering Task Force (IETF) and many related RFCs, and TACACS+ (Terminal Access Controller Access-Control System Plus), which is defined in D. Carrel et al., "The TACACS+ Protocol," IETF Network Working Group Internet-draft named "draft-grant-tacacs-02.txt," January 1997.

The AAA protocol logic 109 is coupled to compliance proxy logic 110 and to a AAA server 116 that operates according to a AAA protocol that is compatible with the AAA protocol logic. The AAA server 116 is coupled to a compliance server 120 having the structure and functions as described above for FIG. 1.

In the arrangement of FIG. 2, in operation, a configuration command is received at command parser 108; compliance proxy logic 110 intercepts the command before execution; the compliance proxy logic calls AAA protocol logic 109 and provides the command; the AAA protocol logic forms a AAA request and encapsulates the command in the request, such as in one or more name-value pairs of a vendor-specific attribute (VSA); and the AAA protocol logic causes sending the AAA request to the AAA server 116.

Upon receiving and parsing the AAA request, the AAA server 116 determines that the request includes a VSA that requires processing using the compliance server 120. In response, the AAA server 116 provides the request or the un-encapsulated command to the compliance server 120, or calls a function of the compliance server that can perform a compliance check on the command. The compliance server 120 checks compliance of the command using the techniques described herein in other sections, and returns a result or response to the AAA server 116. The AAA server 116 then forms a AAA response message and send the response message to the AAA protocol logic, which calls the compliance protocol logic 110 and provides the result or response separated from the response message. Compliance protocol logic 110 then operates as described above to determine whether to accept and execute the command or perform a responsive action.

Compliance server 120 may be implemented using a computer that is separate from or external to the device 102. Alternatively, compliance server 120 may be integrated into a network management station (NMS) or network management application.

Referring now to FIG. 3, in one embodiment, the compliance server 120 of FIG. 2 may be hosted within, or integrated into, the AAA server 116. The AAA server 116 may incorporate an AAA protocol request parser 118 that is configured to parse incoming AAA requests and determine whether to call compliance server 120 or another server to service the requests. The arrangement of FIG. 3 may be integrated into FIG. 2 and may operate as described above for FIG. 2 except that communications between AAA server 116 and compliance server 120 may occur entirely programmatically and do not require the exchange of messages over the network 114. The arrangement of FIG. 3 may be preferred when server 116 has sufficient computing resources to process conventional AAA requests as well as the compliance checking functions described herein.

In various embodiments, AAA server 116 and compliance server 120 may be implemented on the same computer or on different computers. Thus, each server 116, 120 broadly represents either a server computer with logic, applications or software elements configured to operate as described herein, or a software server that is hosted on a general purpose computer and configured to operate as described herein.

Further, each of the command parser 108, AAA protocol logic 109, compliance proxy logic 110, AAA server 116, and compliance server 120 may be implemented in various embodiments using a computer, one or more application-specific integrated circuits (ASICs) or other digital electronic logic, one or more computer programs, modules, objects, methods, or other software elements. For example, in one embodiment the device 102 or compliance server 120 each may comprise a special-purpose computer having particular logic configured to implement the elements and functions described herein. In another embodiment, compliance server 120 may comprise a general purpose computer, and device 102 may comprise a general purpose router or switch as in FIG. 5, loaded with one or more stored programs which transform the general purpose computer into a particular machine upon loading and execution.

For purposes of illustrating clear examples, FIG. 1 and FIG. 2 show one device 102 and one server 120. Practical embodiments may use any number of devices 102 or servers 120. One server 120 may serve a plurality of devices 102.

3.0 Processing Examples

Figure 4:
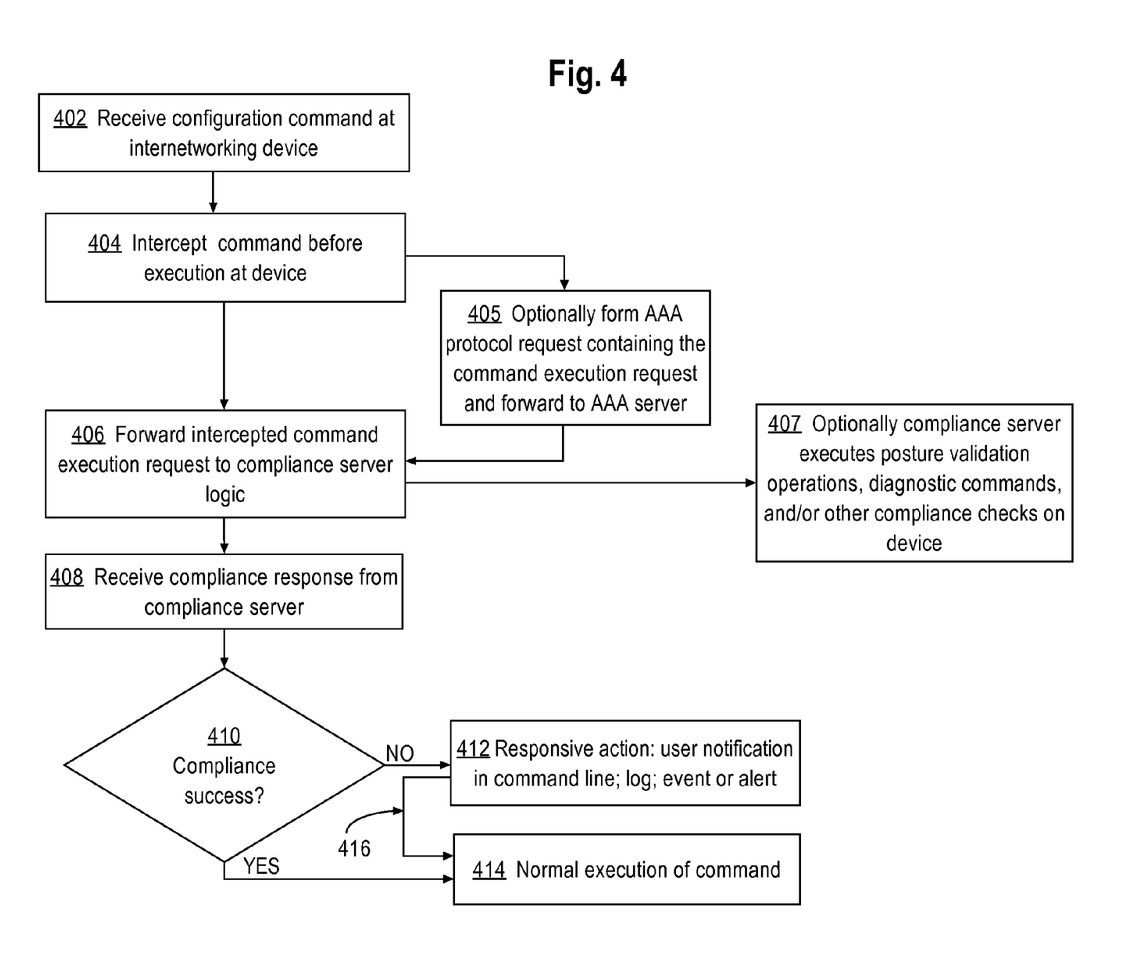
FIG. 4 illustrates an approach for managing command compliance in internetworking devices.

FIG. 4 illustrates an approach for managing command compliance in internetworking devices. In this description, the term "command" refers to all or part of a command, CLI text, etc.

In step 402, a configuration command is received at an internetworking device. In various embodiments the command is received programmatically, or through user input to a command-line interface. The command may indicate configuring the device or performing a particular operation on the device.

In step 404, the command is intercepted before the command is executed at the device. Intercepting the command may occur using any of several mechanisms. In one embodiment, the operating system of the device stores a newly received command in a buffer, consults a list of registered modules or applications, one of which is compliance proxy logic, and calls each of the registered modules or applications using a function call that indicates that a new command is in the buffer. In response, the compliance proxy logic sets a flag value or obtains a lock on the command to inform other applications not to execute the command.

In step 405, optionally a AAA protocol request is formed. The AAA request contains all or part of the command execution request. The AAA protocol request is forwarded to a AAA server for processing. In this approach, communication of messages requesting compliance checks can leverage existing AAA protocol mechanisms for forming and sending requests and processing responses. Further, a compliance server can reuse, for compliance checking, device policies that were configured and stored on the AAA server for other purposes.

When an AAA approach is used, all or part of the intercepted command may be subjected first to normal AAA command authorization processes and then subjected to compliance checks, as described herein, only if normal command authorization passes. Thus, if a command is presented by a user who is not authorized under normal AAA policy to present that command, then there is no need for a compliance check and the command is blocked. If the user is authorized, then compliance checking proceeds as described herein. All steps specified in this paragraph may be performed as part of steps 402, 404, 405, in various embodiments.

In step 406, the intercepted command is forwarded to compliance server logic to check whether execution of the command complies with one or more configured policies or standards. The process then awaits a response from the compliance server logic indicating whether compliance was found.

In step 407, optionally the compliance server executes one or more posture validation operations, diagnostic commands, and/or other compliance checks on the device.

In step 408, the process receives a compliance response from the compliance server. In various embodiments, the compliance response may comprise a pass/fail indication. Alternatively, the response may comprise a score value having a magnitude proportional to the number of compliance checks that passed or failed for the particular command or operation request. Additionally or alternatively, in an embodiment, a compliance response may include an identifier of one or more policies or standards that the command did not pass or comply with. Additionally or alternatively, in an embodiment, a compliance response may include the text of a notification message stating a reason for the response, such as failure to conform to a particular policy or indicating that the running configuration of the device is lacking a particular required command or contains a prohibited command.

In step 410, the process performs a test to determine whether compliance success occurred. In various embodiments, step 410 may comprise acting directly based upon a pass-fail indication in the response from the compliance server. Alternatively, step 410 may comprise applying one or more heuristics or tests to the compliance response to determine whether the command should be executed in view of the content of the compliance response. For example, when the compliance response includes a score value, step 410 may include determining whether the score value is greater or lower than a particular configured threshold value.

Additionally or alternatively, when the compliance response includes a score value, step 410 may include determining whether the score value is greater or lower than a particular configured threshold value that is determined dynamically based upon known attributes of the user or system that requested executing the command. For example, a user identifier of the user may be associated, in a database of the AAA server, with a particular allowed access level, security level, or reputation value, and any one or more of such values may be used to adjust or weight the configured threshold before the score value is compared. Thus, a command that is found non-compliant and is presented from one user might be allowed to proceed based upon a particular user role, whereas a second user having a second role in the AAA server database may not be allowed to execute the same non-compliant command.

In step 414, if the test of step 410 indicates success, then normal execution of the command proceeds.

In step 412, if the test of step 410 indicates failure, then any of several responsive actions may be performed. In various embodiments, responsive actions include generating and sending a user notification in a command-line response to a user terminal; creating a log record; generating an event or alert and sending the event or alert to the user or to another system using an event interface or middleware. For example, the compliance proxy logic 110 or compliance server 120 may be configured, in various embodiments, to generate and send events to a network management station or application for aggregation, flagging, or other reporting.

Alternatively, step 412 may result in sending a notification message or prompt to the user, such as, "Executing this command will violate organizational policy. Do you want to continue?" The compliance proxy logic 110 may be configured to await a user response and to permit execution of the command at step 414 only if the user response is affirmative.

In general, the process of FIG. 4 is structured so that execution of a command can proceed only after the command is intercepted, the command is subjected to one or more compliance tests based on stored or configured compliance policies or standards, and the command is determined to comply with the policies or standards. Further, in an embodiment, as indicated by arrow 416, for some commands that result in compliance failure, it may be appropriate to generate a user notification but allow command execution to proceed after receiving user input confirming that command execution should proceed. Such an option may be appropriate when the risk represented by non-compliance is relatively low, or when the command and current running configuration deviate from standards or policy only by a small degree.

As an example of the approach herein, assume that a user enters a command to apply a particular device energy management operation. Stored policy at the compliance server 120 states or represents that particular network time protocol (NTP) server settings are required. In particular, the device must have a correct NTP server configured and the device's clock must be synchronized to the NTP server at the time at which the command was entered. In an embodiment, upon receiving the device energy management command, the compliance server 120 can check for the presence or absence of particular commands in the copy of the device running configuration 122. Further, the compliance server 120 can run a diagnostic command against the device 102, such as "show NTP status," receive output from the command, and execute one or more pattern matching rules on the output to determine whether the device is synchronized to the NTP server.

The disclosed approaches may be implemented for some or all individual internetworking devices in a network. The approaches are implemented at the individual device level and do not require a global check of all devices from a centralized management point. Instead, each command at a particular device is checked for compliance locally or asynchronously with respect to all other devices.

The disclosed approaches are pro-active and cause an internetworking device to be made aware of configurations that are compliant and non-compliant, and the associated standards that result in compliance or lack of compliance. A device is required to communicate with an external compliance server to validate proposed configuration changes before the changes are executed or applied. A compliance policy may include an option to present a warning or deny the command or operation if it will violate the compliance policy. Consequently, the approaches herein can effectively assist network administrators and other users in verifying that each device configuration command conforms to established policy and standards, and the approaches provide a way to assure that compliance checks are performed, with logging or other audit trails for non-compliant commands.

4.0 Implementation Mechanisms—Hardware Overview

Figure 5:
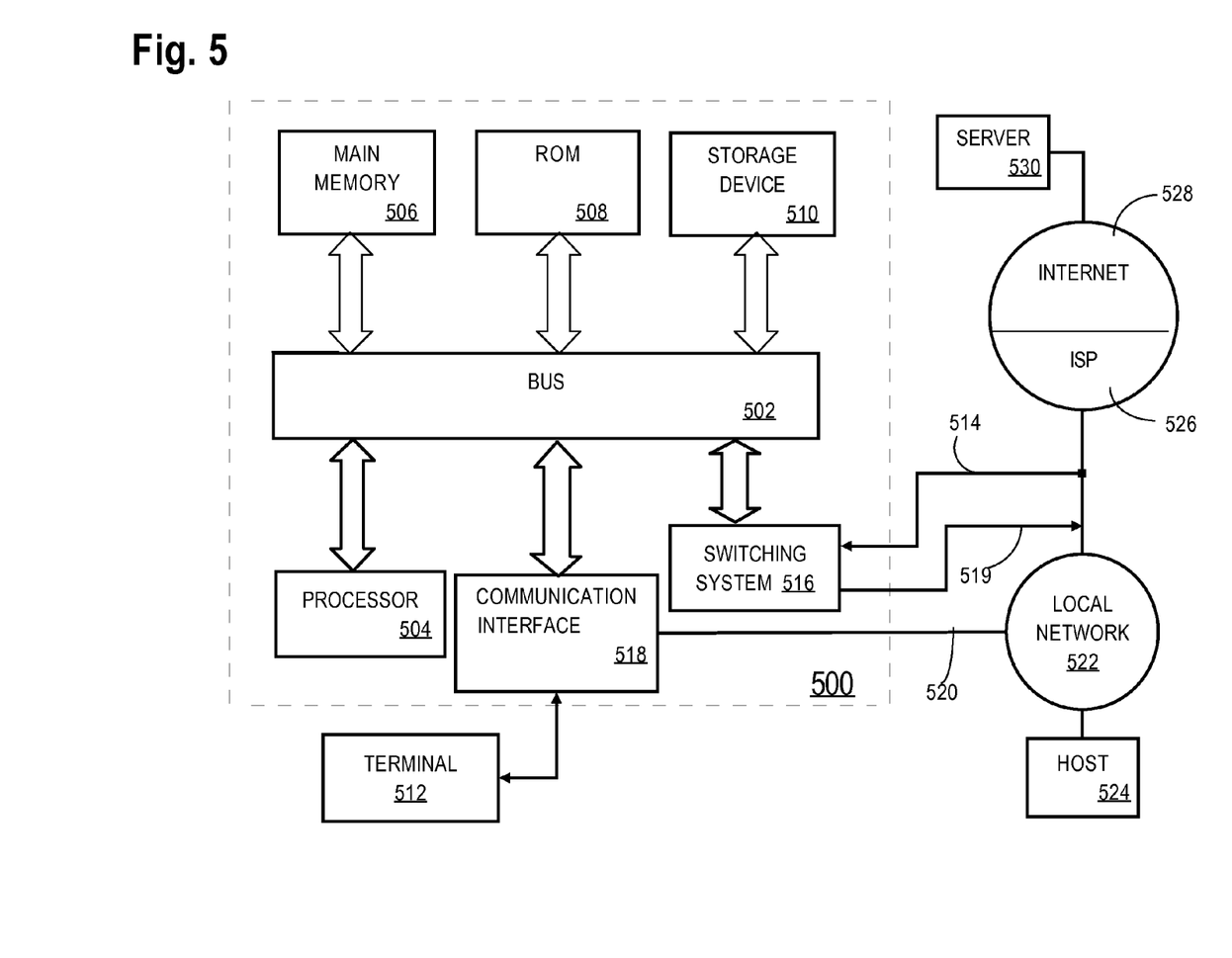
FIG. 5 illustrates a computer system upon which an embodiment may be implemented.

FIG. 5 is a block diagram that illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-422 interface. An external terminal 512 or other computer system connects to the computer system 500 and provides commands to it using the interface 518. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

According to one embodiment, compliance management is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile storage media, volatile storage media, and transmission media. Non-volatile storage media includes, for example, optical or magnetic disks, such as storage device 510. Volatile storage media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other tangible storage medium from which a computer can read.

Various forms of computer readable storage media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for compliance management as described herein. The received code may be executed by processor 504 as it is received, and/or stored in storage device 510, or other non-volatile storage for later execution.

5.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. An apparatus, comprising:
one or more processors;
a non-transitory computer-readable storage medium storing one or more stored sequences of instructions which, when executed by the one or more processors, cause the one or more processors to perform:
receiving, from a device over a network, a request to determine whether a command to configure the device received by the device conforms to one or more compliance policies, wherein the request includes all or part of the command and wherein the one or more compliance policies indicate one or more required device commands or parameters that must be configured on the device before executing the command;
determining, based at least in part on a copy of a running configuration for the device, whether the command would conform to the one or more compliance policies when applied to the running configuration for the device;
in response to determining that the command would conform to the compliance policies, sending, over the network to the device, a compliance response indicating that the command conforms to the one or more compliance policies.

2. The apparatus of claim 1, wherein the request is formed according to an authentication, authorization and access (AAA) protocol.

3. The apparatus of claim 1, wherein the one or more stored sequences of instructions are part of a AAA server.

4. The apparatus of claim 1, further comprising instructions which when executed cause: executing, in response to receiving the request, any one or more of: posture validation operations on the device, diagnostic commands on the device, or one or more other compliance checks on the device.

5. The apparatus of claim 4, further comprising instructions which when executed cause the one or more processors to perform: downloading a copy of the running configuration from the device before performing the posture validation operations, diagnostic commands, or other compliance checks.

6. The apparatus of claim 1, further comprising instructions which when executed cause sending, over the network to the device, a compliance response to block execution of the command when the command fails to conform to the one or more compliance policies.

7. The apparatus of claim 6, wherein the compliance response to block execution of the command causes the device to perform at least one of generating a user notification of non-compliance in a command line interface of the device; creating and storing a log record relating to the non-compliance; or generating one or more events or alerts relating to the non-compliance.

8. A non-transitory computer-readable storage medium storing one or more stored sequences of instructions which, when executed by one or more processors, cause the one or more processors to perform:
receiving, from a device over a network, a request to determine whether a command to configure the device received by the device conforms to one or more compliance policies, wherein the request includes all or part of the command and wherein the one or more compliance policies indicate one or more required device commands or parameters that must be configured on the device before executing the command;
determining, based at least in part on a copy of a running configuration for the device, whether the command would conform to the one or more compliance policies when applied to the running configuration for the device;
in response to determining that the command would conform to the compliance policies, sending, over the network to the device, a compliance response indicating that the command conforms to the one or more compliance policies.

9. The non-transitory computer-readable storage medium of claim 8 wherein the request is formed according to an authentication, authorization and access (AAA) protocol.

10. The non-transitory computer-readable storage medium of claim 8, wherein the one or more stored sequences of instructions are part of a AAA server.

11. The non-transitory computer-readable storage medium of claim 8, further comprising instructions which when executed cause: executing, in response to receiving the request, any one or more of: posture validation operations on the device, diagnostic commands on the device, or one or more other compliance checks on the device.

12. The non-transitory computer-readable storage medium of claim 11, further comprising instructions which when executed cause the one or more processors to perform: downloading a copy of the running configuration from the device before performing the posture validation operations, diagnostic commands, or other compliance checks.

13. The non-transitory computer-readable storage medium of claim 8, further comprising instructions which when executed cause sending, over the network to the device, a compliance response to block execution of the command when the command fails to conform to the one or more compliance policies.

14. The non-transitory computer-readable storage medium of claim 13, wherein the compliance response to block execution of the command causes the device to perform at least one of generating a user notification of non-compliance in a command line interface of the device; creating and storing a log record relating to the non-compliance; or generating one or more events or alerts relating to the non-compliance.

15. A method comprising:
    receiving, from a device over a network, a request to determine whether a command to configure the device received by the device conforms to one or more compliance policies, wherein the request includes all or part of the command and wherein the one or more compliance policies indicate one or more required device commands or parameters that must be configured on the device before executing the command;
    determining, based at least in part on a copy of a running configuration for the device, whether the command would conform to the one or more compliance policies when applied to the running configuration for the device;
    in response to determining that the command would conform to the compliance policies, sending, over the network to the device, a compliance response indicating that the command conforms to the one or more compliance policies.

16. The method of claim 15 wherein the request is formed according to an authentication, authorization and access (AAA) protocol.

17. The method of claim 15, further comprising executing, in response to receiving the request, any one or more of: posture validation operations on the device, diagnostic commands on the device, or one or more other compliance checks on the device.

18. The method of claim 17, further comprising downloading a copy of the running configuration from the device before performing the posture validation operations, diagnostic commands, or other compliance checks.

19. The method of claim 15, further comprising sending, over the network to the device, a compliance response to block execution of the command when the command fails to conform to the one or more compliance policies.

20. The method of claim 19, wherein the compliance response to block execution of the command causes the device to perform at least one of generating a user notification of non-compliance in a command line interface of the device; creating and storing a log record relating to the non-compliance; or generating one or more events or alerts relating to the non-compliance.

* * * * *